(12) United States Patent
Feng et al.

(10) Patent No.: US 12,008,763 B2
(45) Date of Patent: Jun. 11, 2024

(54) VARIABLE APERTURE (VA) CAMERA CONTROL FOR CONTROLLING A DEPTH OF FOCUS

(71) Applicant: QUALCOMM Incorporated, San Diego, CA (US)

(72) Inventors: Wen-Chun Feng, New Taipei (TW); Micha Galor Gluskin, San Diego, CA (US); Hui Shan Kao, New Taipei (TW); Hang-Wei Liaw, North District (TW)

(73) Assignee: QUALCOMM Incorporated, San Diego, CA (US)

( * ) Notice: Subject to any disclaimer, the term of this patent is extended or adjusted under 35 U.S.C. 154(b) by 9 days.

(21) Appl. No.: 17/817,584

(22) Filed: Aug. 4, 2022

(65) Prior Publication Data

US 2024/0046477 A1 Feb. 8, 2024

(51) Int. Cl.
| | |
|---|---|
| *G06T 7/11* | (2017.01) |
| *G06T 7/80* | (2017.01) |
| *H04N 23/611* | (2023.01) |
| *H04N 23/959* | (2023.01) |

(52) U.S. Cl.
CPC ............. *G06T 7/11* (2017.01); *G06T 7/80* (2017.01); *H04N 23/611* (2023.01); *H04N 23/959* (2023.01)

(58) Field of Classification Search
CPC ........... G06T 7/11; G06T 7/80; H04N 23/611; H04N 23/959
See application file for complete search history.

(56) References Cited

U.S. PATENT DOCUMENTS

| | | | |
|---|---|---|---|
| 2012/0057067 A1 | 3/2012 | Lee | |
| 2013/0259459 A1 | 10/2013 | Mick et al. | |
| 2015/0116577 A1 | 4/2015 | Lin et al. | |
| 2020/0195909 A1* | 6/2020 | Shintani | G06T 5/50 |

OTHER PUBLICATIONS

International Search Report and Written Opinion—PCT/US2023/070936—ISA/EPO—Nov. 6, 2023.

* cited by examiner

*Primary Examiner* — Yogesh K Aggarwal
(74) *Attorney, Agent, or Firm* — QUALCOMM Incorporated

(57) ABSTRACT

This disclosure provides systems, methods, and devices for image capture and image processing that support capture using a variable aperture (VA) camera. In a first aspect, a method of image processing includes determining a plurality of depths for a scene, the plurality of depths corresponding to a plurality of regions of interest; determining an aperture size for a camera based on the plurality of depths; determining a lens position for the camera based on the aperture size and the plurality of depths; and controlling the camera to adjust a variable aperture (VA) of the camera based on the aperture size and to adjust a lens associated with the variable aperture (VA) based on the lens position. Other aspects and features are also claimed and described.

25 Claims, 7 Drawing Sheets

VARIABLE APERTURE (VA) CAMERA CONTROL FOR CONTROLLING A DEPTH OF FOCUS

TECHNICAL FIELD

Aspects of the present disclosure relate generally to image capture devices, and more particularly, to control of a camera configuration for obtaining image data. Some features may enable and provide improved image capture control, including use of a variable aperture (VA) to obtain a desired depth of focus from a camera.

INTRODUCTION

Image capture devices are devices that can capture one or more digital images, whether still image for photos or sequences of images for videos. Capture devices can be incorporated into a wide variety of devices. By way of example, image capture devices may comprise stand-alone digital cameras or digital video camcorders, camera-equipped wireless communication device handsets, such as mobile telephones, cellular or satellite radio telephones, personal digital assistants (PDAs), panels or tablets, gaming devices, computer devices such as webcams, video surveillance cameras, or other devices with digital imaging or video capabilities.

In certain scenes, a photographer may desire to direct the viewer's focus to one portion of the scene. For example, in a portrait photograph of a person, the photographer may desire for the viewer to focus on the person, rather than other scenery. The photographer may choose a low aperture lens for such a photograph, because the low aperture results in objects at different depths than the person being significantly blurred. Changing aperture size usually requires replacing components of the camera, but changing components of a camera is a slow process.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In some aspects, a variable aperture (VA) may be included in a camera of an image capture device. The variable aperture (VA) may be controlled through electronic signals without replacing the camera of the image capture device. The variable aperture (VA) may be controlled during operation of the camera to obtain different aperture sizes corresponding to predetermined criteria. The criteria may include a desired depth of focus based on depths of a plurality of regions of interest for a scene. The desired depth of focus may be determined to obtain an aperture size with a depth of focus to obtain an image frame with multiple regions of interest in focus. The multiple regions of interest may include multiple people, such that a variable aperture (VA) is controlled to obtain a desired depth of focus for the scene. A lens position for the camera may also be determined to configure the depth of focus of the camera. Including a variable aperture (VA) in a camera and controlling the aperture size and a lens position of the camera may improve the quality of images obtained from the camera.

In one aspect of the disclosure, a method for image processing includes determining a plurality of depths for a scene, the plurality of depths corresponding to a plurality of regions of interest; determining an aperture size for a camera based on the plurality of depths; determining a lens position for the camera based on the aperture size and the plurality of depths; and controlling the camera to adjust a variable aperture (VA) of the camera based on the aperture size and to adjust a lens associated with the variable aperture (VA) based on the lens position.

In an additional aspect of the disclosure, an apparatus includes at least one processor and a memory coupled to the at least one processor. The at least one processor is configured for determining a plurality of depths for a scene, the plurality of depths corresponding to a plurality of regions of interest; determining an aperture size for a camera based on the plurality of depths; determining a lens position for the camera based on the aperture size and the plurality of depths; and controlling the camera to adjust a variable aperture (VA) of the camera based on the aperture size and to adjust a lens associated with the variable aperture (VA) based on the lens position.

In an additional aspect of the disclosure, an apparatus includes means for determining a plurality of depths for a scene, the plurality of depths corresponding to a plurality of regions of interest; means for determining an aperture size for a camera based on the plurality of depths; means for determining a lens position for the camera based on the aperture size and the plurality of depths; and means for controlling the camera to adjust a variable aperture (VA) of the camera based on the aperture size and to adjust a lens associated with the variable aperture (VA) based on the lens position.

In an additional aspect of the disclosure, a non-transitory computer-readable medium stores instructions that, when executed by a processor, cause the processor to perform operations. The operations include determining a plurality of depths for a scene, the plurality of depths corresponding to a plurality of regions of interest; determining an aperture size for a camera based on the plurality of depths; determining a lens position for the camera based on the aperture size and the plurality of depths; and controlling the camera to adjust a variable aperture (VA) of the camera based on the aperture size and to adjust a lens associated with the variable aperture (VA) based on the lens position.

Methods of image processing described herein may be performed by an image capture device and/or performed on image data captured by one or more image capture devices. Image capture devices, devices that can capture one or more digital images whether still image photos or sequences of images for videos, can be incorporated into a wide variety of devices. By way of example, image capture devices may comprise stand-alone digital cameras or digital video camcorders, camera-equipped wireless communication device handsets, such as mobile telephones, cellular or satellite radio telephones, personal digital assistants (PDAs), panels or tablets, gaming devices, computer devices such as webcams, video surveillance cameras, or other devices with digital imaging or video capabilities.

The image processing techniques described herein may involve digital cameras having image sensors and processing circuitry (e.g., application specific integrated circuits (ASICs), digital signal processors (DSP), graphics processing unit (GPU), central processing unit (CPU)). An image signal processor (ISP) may include one or more of these processing circuits and configured to perform operations to obtain the image data for processing according to the image processing techniques described herein and/or involved in the image processing techniques described herein. The ISP may be configured to control the capture of image frames from one or more image sensors and determine one or more image frames from the one or more image sensors to generate a view of a scene in an output image frame. The output image frame may be part of a sequence of image frames forming a video sequence. The video sequence may include other image frames received from the image sensor or other images sensors.

In an example application, the image signal processor (ISP) may receive an instruction to capture a sequence of image frames in response to the loading of software, such as a camera application, to produce a preview display from the image capture device. The image signal processor may be configured to produce a single flow of output image frames, based on images frames received from one or more image sensors. The single flow of output image frames may include raw image data from an image sensor, binned image data from an image sensor, or corrected image data processed by one or more algorithms within the image signal processor. For example, an image frame obtained from an image sensor, which may have performed some processing on the data before output to the image signal processor, may be processed in the image signal processor by processing the image frame through an image post-processing engine (IPE) and/or other image processing circuitry for performing one or more of tone mapping, portrait lighting, contrast enhancement, gamma correction, etc. The output image frame from the ISP may be stored in memory and retrieved by an application processor executing the camera application, which may perform further processing on the output image frame to adjust an appearance of the output image frame and reproduce the output image frame on a display for view by the user.

After an output image frame representing the scene is determined by the image signal processor and/or determined by the application processor, such as through image processing techniques described in various embodiments herein, the output image frame may be displayed on a device display as a single still image and/or as part of a video sequence, saved to a storage device as a picture or a video sequence, transmitted over a network, and/or printed to an output medium. For example, the image signal processor (ISP) may be configured to obtain input frames of image data (e.g., pixel values) from the one or more image sensors, and in turn, produce corresponding output image frames (e.g., preview display frames, still-image captures, frames for video, frames for object tracking, etc.). In other examples, the image signal processor may output image frames to various output devices and/or camera modules for further processing, such as for 3A parameter synchronization (e.g., automatic focus (AF), automatic white balance (AWB), and automatic exposure control (AEC)), producing a video file via the output frames, configuring frames for display, configuring frames for storage, transmitting the frames through a network connection, etc. Generally, the image signal processor (ISP) may obtain incoming frames from one or more image sensors and produce and output a flow of output frames to various output destinations.

In some aspects, the output image frame may be produced by combining aspects of the image correction of this disclosure with other computational photography techniques such as high dynamic range (HDR) photography or multi-frame noise reduction (MFNR). With HDR photography, a first image frame and a second image frame are captured using different exposure times, different apertures, different lenses, and/or other characteristics that may result in improved dynamic range of a fused image when the two image frames are combined. In some aspects, the method may be performed for MFNR photography in which the first image frame and a second image frame are captured using the same or different exposure times and fused to generate a corrected first image frame with reduced noise compared to the captured first image frame.

In some aspects, a device may include an image signal processor or a processor (e.g., an application processor) including specific functionality for camera controls and/or processing, such as enabling or disabling the binning module or otherwise controlling aspects of the image correction. The methods and techniques described herein may be entirely performed by the image signal processor or a processor, or various operations may be split between the image signal processor and a processor, and in some aspects split across additional processors.

The device may include one, two, or more image sensors, such as including a first image sensor. When multiple image sensors are present, the image sensors may be differently configured. For example, the first image sensor may have a larger field of view (FOV) than the second image sensor or the first image sensor may have different sensitivity or different dynamic range than the second image sensor. In one example, the first image sensor may be a wide-angle image sensor, and the second image sensor may be a tele image sensor. In another example, the first sensor is configured to obtain an image through a first lens with a first optical axis and the second sensor is configured to obtain an image through a second lens with a second optical axis different from the first optical axis. Additionally or alternatively, the first lens may have a first magnification, and the second lens may have a second magnification different from the first magnification. Any of these or other configurations may be part of a lens cluster on a mobile device, such as where multiple image sensors and associated lenses are located in offset locations on a frontside or a backside of the mobile device. Additional image sensors may be included with larger, smaller, or same field of views. The image processing techniques described herein may be applied to image frames captured from any of the image sensors in a multi-sensor device.

In an additional aspect of the disclosure, a device configured for image processing and/or image capture is disclosed. The apparatus includes means for capturing image frames. The apparatus further includes one or more means for capturing data representative of a scene, such as image sensors (including charge-coupled devices (CCDs), Bayer-filter sensors, infrared (IR) detectors, ultraviolet (UV) detectors, complimentary metal-oxide-semiconductor (CMOS) sensors), time of flight detectors. The apparatus may further include one or more means for accumulating and/or focusing light rays into the one or more image sensors (including simple lenses, compound lenses, spherical lenses, and non-spherical lenses). These components may be controlled to capture the first and/or second image frames input to the image processing techniques described herein.

Other aspects, features, and implementations will become apparent to those of ordinary skill in the art, upon reviewing the following description of specific, exemplary aspects in conjunction with the accompanying figures. While features may be discussed relative to certain aspects and figures below, various aspects may include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects may be implemented in various devices, systems, and methods.

The method may be embedded in a computer-readable medium as computer program code comprising instructions that cause a processor to perform the steps of the method. In some embodiments, the processor may be part of a mobile device including a first network adaptor configured to transmit data, such as images or videos in as a recording or as streaming data, over a first network connection of a plurality of network connections; and a processor coupled to the first network adaptor, and the memory. The processor may cause the transmission of output image frames described herein over a wireless communications network such as a 5G NR communication network.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
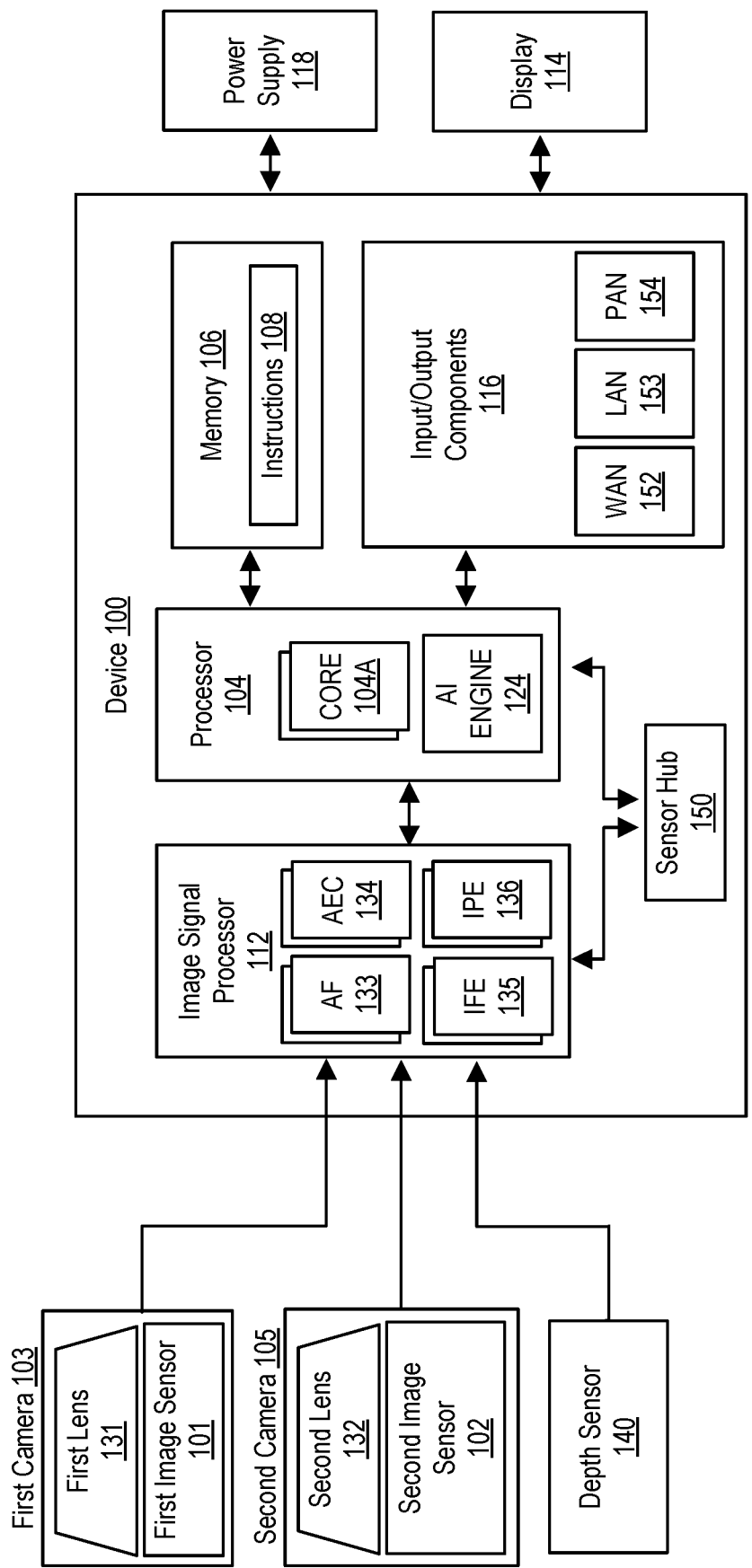
FIG. 1 shows a block diagram of an example device for performing image capture from one or more image sensors.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support image capture operations and subsequent image processing operations, including techniques for controlling a configuration of a camera of an image capture device. The camera may include a variable aperture (VA). The camera configuration may specify an aperture size for the variable aperture (VA) and a lens position for a lens to set a focus depth around which the depth of focus is centered for the scene.

Particular implementations of the subject matter described in this disclosure may be implemented to realize one or more of the following potential advantages or benefits. In some aspects, the present disclosure provides techniques for capturing images with multiple objects, such as multiple people, in focus. The techniques may also provide an optimized depth of focus and lens position for the camera. Obtaining images with multiple regions of interest in sharp detail from the camera may reduce or eliminate post-processing for deblurring regions of interest, which reduces computational time and reduces battery consumption in the image capture device.

An example device for capturing image frames using one or more image sensors, such as a smartphone, may include a configuration of one, two, three, four, or more cameras on a backside (e.g., a side opposite a primary user display) and/or a front side (e.g., a same side as a primary user display) of the device. The devices may include one or more image signal processors (ISPs), Computer Vision Processors (CVPs) (e.g., AI engines), or other suitable circuitry for processing images captured by the image sensors. The one or more image signal processors (ISP) may store output image frames in a memory and/or otherwise provide the output image frames to processing circuitry (such as through a bus). The processing circuitry may perform further processing, such as for encoding, storage, transmission, or other manipulation of the output image frames.

As used herein, image sensor may refer to the image sensor itself and any certain other components coupled to the image sensor used to generate an image frame for processing by the image signal processor or other logic circuitry or storage in memory, whether a short-term buffer or longer-term non-volatile memory. For example, an image sensor may include other components of a camera, including a shutter, buffer, or other readout circuitry for accessing individual pixels of an image sensor. The image sensor may further refer to an analog front end or other circuitry for converting analog signals to digital representations for the image frame that are provided to digital circuitry coupled to the image sensor.

In the description of embodiments herein, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well known circuits and devices are shown in block diagram form to avoid obscuring teachings of the present disclosure.

Some portions of the detailed descriptions which follow are presented in terms of procedures, logic blocks, processing, and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

In the figures, a single block may be described as performing a function or functions. The function or functions performed by that block may be performed in a single component or across multiple components, and/or may be performed using hardware, software, or a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory, and the like.

Aspects of the present disclosure are applicable to any electronic device including, coupled to, or otherwise processing data from one, two, or more image sensors capable of capturing image frames (or "frames"). The terms "output image frame" and "corrected image frame" may refer to Further, aspects of the present disclosure may be implemented in devices having or coupled to image sensors of the same or different capabilities and characteristics (such as resolution, shutter speed, sensor type, and so on). Further, aspects of the present disclosure may be implemented in devices for processing image frames, whether or not the device includes or is coupled to the image sensors, such as processing devices that may retrieve stored images for processing, including processing devices present in a cloud computing system.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling," "generating" or the like, refer to the actions and processes of a computer system, or similar electronic computing device, that manipulates and transforms data represented as physical (electronic) quantities within the computer system's registers and memories into other data similarly represented as physical quantities within the computer system's registers, memories, or other such information storage, transmission, or display devices.

The terms "device" and "apparatus" are not limited to one or a specific number of physical objects (such as one smartphone, one camera controller, one processing system, and so on). As used herein, a device may be any electronic device with one or more parts that may implement at least some portions of the disclosure. While the description and examples herein use the term "device" to describe various aspects of the disclosure, the term "device" is not limited to a specific configuration, type, or number of objects. As used herein, an apparatus may include a device or a portion of the device for performing the described operations.

Certain components in a device or apparatus described as "means for accessing," "means for receiving," "means for sending," "means for using," "means for selecting," "means for determining," "means for normalizing," "means for multiplying," or other similarly-named terms referring to one or more operations on data, such as image data, may refer to processing circuitry (e.g., application specific integrated circuits (ASICs), digital signal processors (DSP), graphics processing unit (GPU), central processing unit (CPU)) configured to perform the recited function through hardware, software, or a combination of hardware configured by software.

FIG. 1 shows a block diagram of an example device 100 for performing image capture from one or more image sensors. The device 100 may include, or otherwise be coupled to, an image signal processor 112 for processing image frames from one or more image sensors, such as a first image sensor 101, a second image sensor 102, and a depth sensor 140. In some implementations, the device 100 also includes or is coupled to a processor 104 and a memory 106 storing instructions 108. The device 100 may also include or be coupled to a display 114 and input/output (I/O) components 116. I/O components 116 may be used for interacting with a user, such as a touch screen interface and/or physical buttons. I/O components 116 may also include network interfaces for communicating with other devices, including a wide area network (WAN) adaptor 152, a local area network (LAN) adaptor 153, and/or a personal area network (PAN) adaptor 154. An example WAN adaptor is a 4G LTE or a 5G NR wireless network adaptor. An example LAN adaptor 153 is a IEEE 802.11 WiFi wireless network adapter. An example PAN adaptor 154 is a Bluetooth wireless network adaptor. Each of the adaptors 152, 153, and/or 154 may be coupled to an antenna, including multiple antennas configured for primary and diversity reception and/or configured for receiving specific frequency bands. The device 100 may further include or be coupled to a power supply 118 for the device 100, such as a battery or a component to couple the device 100 to an energy source. The device 100 may also include or be coupled to additional features or components that are not shown in FIG. 1. In one example, a wireless interface, which may include a number of transceivers and a baseband processor, may be coupled to or included in WAN adaptor 152 for a wireless communication device. In a further example, an analog front end (AFE) to convert analog image frame data to digital image frame data may be coupled between the image sensors 101 and 102 and the image signal processor 112.

The device may include or be coupled to a sensor hub 150 for interfacing with sensors to receive data regarding movement of the device 100, data regarding an environment around the device 100, and/or other non-camera sensor data. One example non-camera sensor is a gyroscope, a device configured for measuring rotation, orientation, and/or angular velocity to generate motion data. Another example non-camera sensor is an accelerometer, a device configured for measuring acceleration, which may also be used to determine velocity and distance traveled by appropriately integrating the measured acceleration, and one or more of the acceleration, velocity, and or distance may be included in generated motion data. In some aspects, a gyroscope in an electronic image stabilization system (EIS) may be coupled to the sensor hub or coupled directly to the image signal processor 112. In another example, a non-camera sensor may be a global positioning system (GPS) receiver.

The image signal processor 112 may receive image data, such as used to form image frames. In one embodiment, a local bus connection couples the image signal processor 112 to image sensors 101 and 102 of a first camera 103 and second camera 105, respectively. In another embodiment, a wire interface couples the image signal processor 112 to an external image sensor. In a further embodiment, a wireless interface couples the image signal processor 112 to the image sensor 101, 102.

The first camera 103 may include the first image sensor 101 and a corresponding first lens 131. The second camera may include the second image sensor 102 and a corresponding second lens 132. Each of the lenses 131 and 132 may be controlled by an associated autofocus (AF) algorithm 133 executing in the ISP 112, which adjust the lenses 131 and 132 to focus on a particular focal plane at a certain scene depth from the image sensors 101 and 102. The AF algorithm 133 may be assisted by depth sensor 140.

The first image sensor 101 and the second image sensor 102 are configured to capture one or more image frames. Lenses 131 and 132 focus light at the image sensors 101 and 102, respectively, through one or more apertures for receiving light, one or more shutters for blocking light when outside an exposure window, one or more color filter arrays (CFAs) for filtering light outside of specific frequency ranges, one or more analog front ends for converting analog measurements to digital information, and/or other suitable components for imaging. The first lens 131 and second lens 132 may have different field of views to capture different representations of a scene. For example, the first lens 131 may be an ultra-wide (UW) lens and the second lens 132 may be a wide (W) lens. The multiple image sensors may include a combination of ultra-wide (high field-of-view (FOV)), wide, tele, and ultra-tele (low FOV) sensors.

That is, each image sensor may be configured through hardware configuration and/or software settings to obtain different, but overlapping, field of views. In one configuration, the image sensors are configured with different lenses with different magnification ratios that result in different fields of view. The sensors may be configured such that a UW sensor has a larger FOV than a W sensor, which has a larger FOV than a T sensor, which has a larger FOV than a UT sensor. For example, a sensor configured for wide FOV may capture fields of view in the range of 64-84 degrees, a sensor configured for ultra-side FOV may capture fields of view in the range of 100-140 degrees, a sensor configured for tele FOV may capture fields of view in the range of 10-30 degrees, and a sensor configured for ultra-tele FOV may capture fields of view in the range of 1-8 degrees.

The image signal processor 112 processes image frames captured by the image sensors 101 and 102. While FIG. 1 illustrates the device 100 as including two image sensors 101 and 102 coupled to the image signal processor 112, any number (e.g., one, two, three, four, five, six, etc.) of image sensors may be coupled to the image signal processor 112. In some aspects, depth sensors such as depth sensor 140 may be coupled to the image signal processor 112 and output from the depth sensors processed in a similar manner to that of image sensors 101 and 102. Example depth sensors include active sensors, including one or more of indirect Time of Flight (iToF), direct Time of Flight (dToF), light detection and ranging (Lidar), mmWave, radio detection and ranging (Radar), and/or hybrid depth sensors, such as structured light. In embodiments without depth sensor 140, similar information regarding depth of objects or a depth map may be generated in a passive manner from disparity between two image sensors (e.g., using depth-from-disparity or depth-from-stereo), phase detection auto-focus (PDAF) sensors, or the like. In addition, any number of additional image sensors or image signal processors may exist for the device 100.

In some embodiments, the image signal processor 112 may execute instructions from a memory, such as instructions 108 from the memory 106, instructions stored in a separate memory coupled to or included in the image signal processor 112, or instructions provided by the processor 104.

In addition, or in the alternative, the image signal processor 112 may include specific hardware (such as one or more integrated circuits (ICs)) configured to perform one or more operations described in the present disclosure. For example, the image signal processor 112 may include one or more image front ends (IFEs) 135, one or more image post-processing engines 136 (IPEs), and or one or more auto exposure compensation (AEC) 134 engines. The AF 133, AEC 134, IFE 135, IPE 136 may each include application-specific circuitry, be embodied as software code executed by the ISP 112, and/or a combination of hardware within and software code executing on the ISP 112.

In some implementations, the memory 106 may include a non-transient or non-transitory computer readable medium storing computer-executable instructions 108 to perform all or a portion of one or more operations described in this disclosure. In some implementations, the instructions 108 include a camera application (or other suitable application) to be executed by the device 100 for generating images or videos. The instructions 108 may also include other applications or programs executed by the device 100, such as an operating system and specific applications other than for image or video generation. Execution of the camera application, such as by the processor 104, may cause the device 100 to generate images using the image sensors 101 and 102 and the image signal processor 112. The memory 106 may also be accessed by the image signal processor 112 to store processed frames or may be accessed by the processor 104 to obtain the processed frames. In some embodiments, the device 100 does not include the memory 106. For example, the device 100 may be a circuit including the image signal processor 112, and the memory may be outside the device 100. The device 100 may be coupled to an external memory and configured to access the memory for writing output frames for display or long-term storage. In some embodiments, the device 100 is a system-on-chip (SoC) that incorporates the image signal processor 112, the processor 104, the sensor hub 150, the memory 106, and input/output components 116 into a single package.

In some embodiments, at least one of the image signal processor 112 or the processor 104 executes instructions to perform various operations described herein, including variable aperture (VA) control and image processing operations. For example, execution of the instructions can instruct the image signal processor 112 to begin or end capturing an image frame or a sequence of image frames, in which the capture includes variable aperture (VA) control and image processing as described in embodiments herein. In some embodiments, the processor 104 may include one or more general-purpose processor cores 104A capable of executing scripts or instructions of one or more software programs, such as instructions 108 stored within the memory 106. For example, the processor 104 may include one or more application processors configured to execute the camera application (or other suitable application for generating images or video) stored in the memory 106.

In executing the camera application, the processor 104 may be configured to instruct the image signal processor 112 to perform one or more operations with reference to the image sensors 101 or 102. For example, a camera application executing on processor 104 may receive a user command to begin a video preview display upon which a video comprising a sequence of image frames is captured and processed from one or more image sensors 101 or 102 through the image signal processor 112. Image processing to generate "output" or "corrected" image frames, such as according to techniques described herein, may be applied to one or more image frames in the sequence. Execution of instructions 108 outside of the camera application by the processor 104 may also cause the device 100 to perform any number of functions or operations. In some embodiments, the processor 104 may include ICs or other hardware (e.g., an artificial intelligence (AI) engine 124 or other co-processor) to offload certain tasks from the cores 104A. The AI engine 124 may be used to offload tasks related to, for example, face detection and/or object recognition. In some other embodiments, the device 100 does not include the processor 104, such as when all of the described functionality is configured in the image signal processor 112.

In some embodiments, the display 114 may include one or more suitable displays or screens allowing for user interaction and/or to present items to the user, such as a preview of the image frames being captured by the image sensors 101 and 102. In some embodiments, the display 114 is a touch-sensitive display. The I/O components 116 may be or include any suitable mechanism, interface, or device to receive input (such as commands) from the user and to provide output to the user through the display 114. For example, the I/O components 116 may include (but are not limited to) a graphical user interface (GUI), a keyboard, a mouse, a microphone, speakers, a squeezable bezel, one or more buttons (such as a power button), a slider, a switch, and so on.

While shown to be coupled to each other via the processor 104, components (such as the processor 104, the memory 106, the image signal processor 112, the display 114, and the I/O components 116) may be coupled to each another in other various arrangements, such as via one or more local buses, which are not shown for simplicity. While the image signal processor 112 is illustrated as separate from the processor 104, the image signal processor 112 may be a core of a processor 104 that is an application processor unit (APU), included in a system on chip (SoC), or otherwise included with the processor 104. While the device 100 is referred to in the examples herein for performing aspects of the present disclosure, some device components may not be shown in FIG. 1 to prevent obscuring aspects of the present disclosure. Additionally, other components, numbers of components, or combinations of components may be included in a suitable device for performing aspects of the present disclosure. As such, the present disclosure is not limited to a specific device or configuration of components, including the device 100.

The exemplary image capture device of FIG. 1 may be operated as to obtain improved images by controlling the configuration of one or more cameras, such as camera 103, to obtain an image frame for a photograph or video that has multiple objects in focus. The control of camera 103 may include adjusting an aperture size of a variable aperture in one or more cameras and/or adjusting a lens position to set a focal depth for the camera 103. One example method of operating one or more cameras, such as camera 103, is shown in FIG. 2 and described below.

Figure 2:
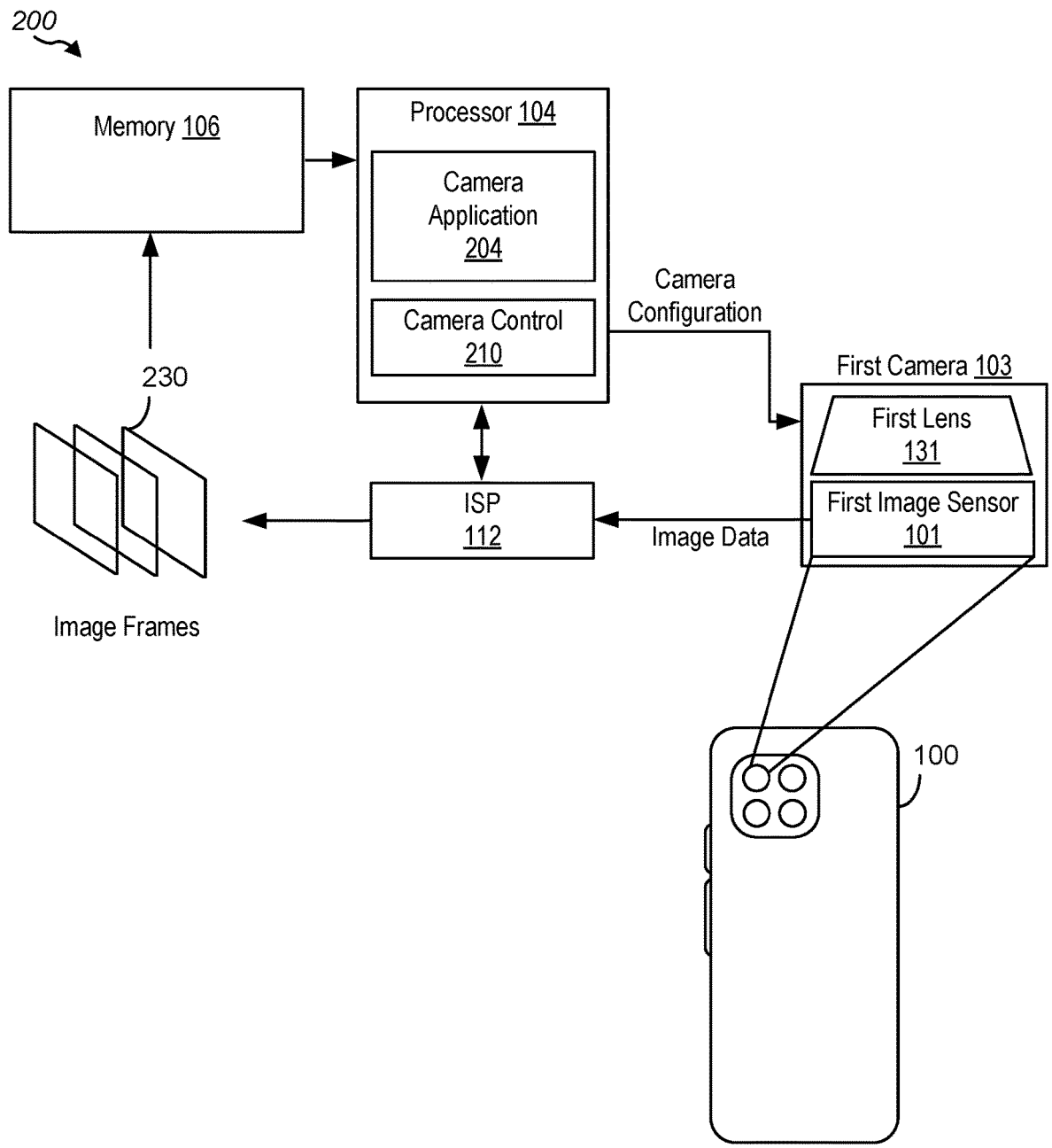
FIG. 2 is a block diagram illustrating an example data flow path for image data processing in an image capture device according to one or more embodiments of the disclosure.

FIG. 2 is a block diagram illustrating an example data flow path for image data processing in an image capture device according to one or more embodiments of the disclosure. The processor 104 of system 200 may communicate with image signal processor (ISP) 112 through a bi-directional bus and/or separate control and data lines. The processor 104 may control camera 103 through camera control 210, such as for configuring the camera 103 through a driver executing on the processor 104. The camera control 210 may be managed by a camera application 204 executing on the processor 104, which provides settings accessible to a user such that a user can specify individual camera settings or select a profile with corresponding camera settings. The camera control 210 communicates with the camera 103 to configure the camera 103 in accordance with commands received from the camera application 204. The camera application 204 may be, for example, a photography application, a document scanning application, a messaging application, or other application that processes image data acquired from camera 103.

Figure 3:
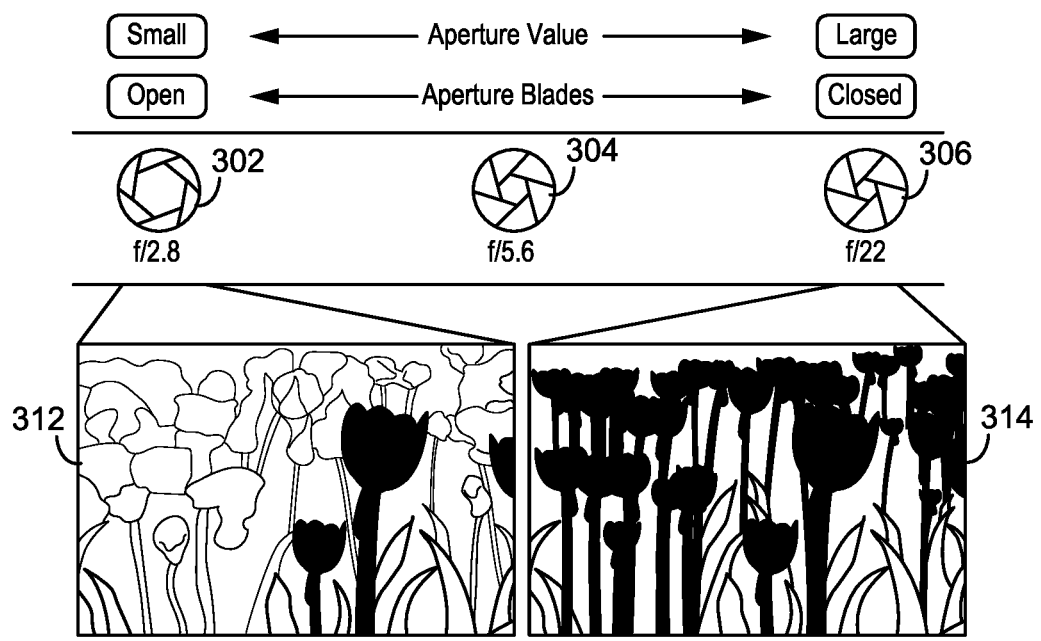
FIG. 3 is a pictorial representation of a variable aperture at several aperture sizes as may be controlled by a camera configuration according to one or more embodiments of the disclosure.

The camera configuration may parameters that specify, for example, a frame rate, an image resolution, a readout duration, an exposure level, an aspect ratio, an aperture size, etc. An example effect of aperture size on an output image frame is shown in FIG. 3. FIG. 3 is a pictorial representation of a variable aperture at several aperture sizes as may be controlled by a camera configuration according to one or more embodiments of the disclosure. A variable aperture may be configured in one of the configurations corresponding to aperture 302, aperture 304, or aperture 306. Smaller aperture values, such as aperture value (or "f-stop") f/2.8 of aperture 302, results in a larger opening to increase an amount of light reaching an image sensor in the shadow of the aperture 302. Larger aperture values, such as aperture value (or "f-stop") f/22 of aperture 306, results in a smaller opening to reduce an amount of light reaching an image sensor in the shadow of the aperture 306. Other aperture sizes, such as aperture value (or "f-stop") f/5.6 of aperture 304, provides additional variability in the characteristics of a captured image frame. The effect of various aperture sizes 302, 304, 306 may be to brighten or darken an image frame captured through the aperture. Another effect of various aperture sizes 302, 304, 306 may be to adjust a depth of focus of an image frame captured through the aperture. A smaller aperture value may result in an image frame with a lower depth of field as shown in image 312, which increases blur in the image frame at depths away from a focal depth. A larger aperture value may result in an image frame with a higher depth of field as shown in image 314, which decrease blue in the image frame at depths away from a focal depth.

Referring back to FIG. 2, the camera 103 may obtain image data based on the camera configuration. For example, the processor 104 may execute a camera application 204 to instruct camera 103, through camera control 210, to set a first camera configuration for the camera 103, to obtain first image data from the camera 103 operating in the first camera configuration, to instruct camera 103 to set a second camera configuration for the camera 103, and to obtain second image data from the camera 103 operating in the second camera configuration.

In an example operation, the camera application 204 may determine the presence of one or more regions in a scene within the field of view of camera 103 to be sharp within an image frame. The one or more regions may be determined based on user input, such as a user tapping a point on the screen or drawing a region on the screen. The one or more regions may be determined based on an algorithm, such as an algorithm identifying bright regions of the scene. The one or more regions may be determined based on analysis of the scene, such as by using an object detector (e.g., a face detector) to identify a region of the scene with an object of interest.

The image data received from camera 103 may be processed in one or more blocks of the ISP 112 to form image frames 230 that are stored in memory 106 and/or provided to the processor 104. The processor 104 may further process the image data to apply effects to the image frames 230. Effects may include Bokeh, lighting, color casting, and/or high dynamic range (HDR) merging. In some embodiments, functionality may be embedded in a different component, such as the ISP 112, a DSP, an ASIC, or other custom logic circuit for performing the additional image processing.

Figure 4:
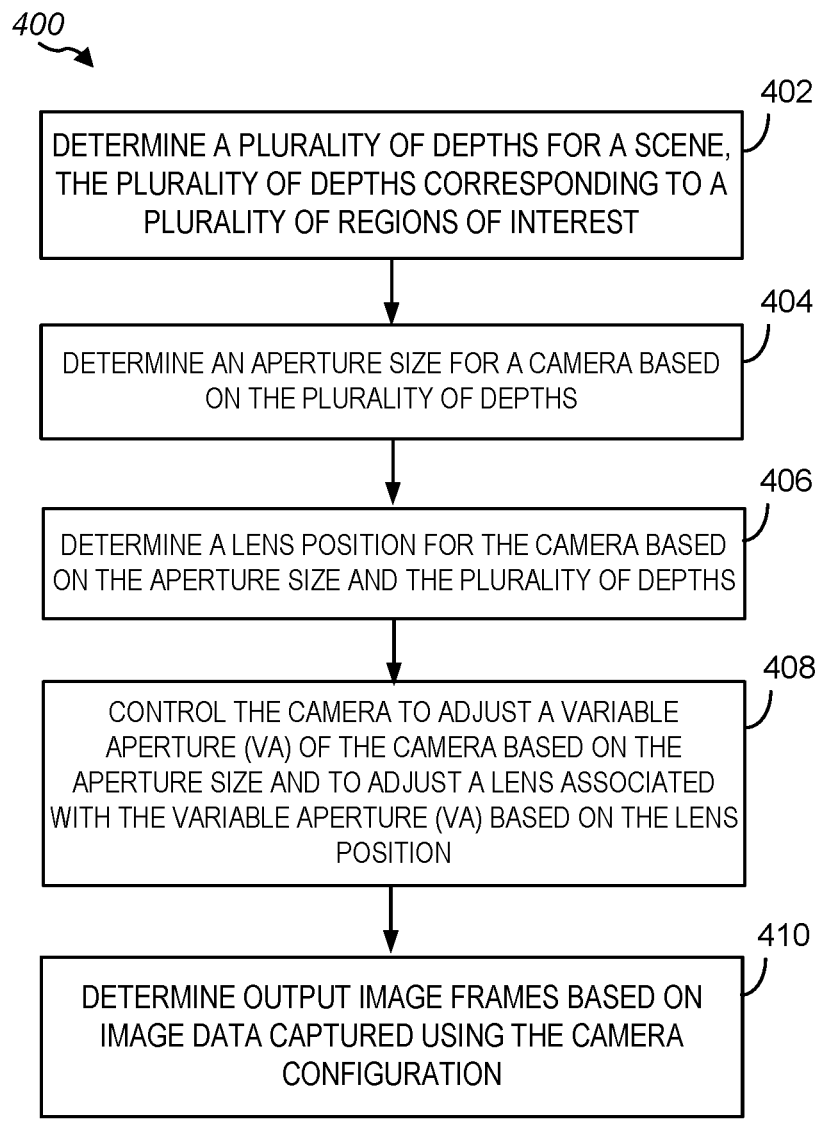
FIG. 4 shows a flow chart of an example method for controlling a camera to capture images with desired portions of a scene in focus according to some embodiments of the disclosure.

The system 200 of FIG. 2 may be configured to perform the operations described with reference to FIG. 4 to determine output image frames 230. FIG. 4 shows a flow chart of an example method for controlling a camera to capture images with desired portions of a scene in focus according to some embodiments of the disclosure. The capturing in FIG. 4 may obtain an improved digital representation of a scene, which results in a photograph or video with higher image quality (IQ).

At block 402, a plurality of depths may be determined for a scene with each of the plurality of depths corresponding to a region of interest in the scene. Regions of interest in the scene may be determined by user input or algorithms executing on the image capture device. Each region of interest may have a different depth, or distance from the image capture device, such that certain aperture sizes may result in the some of the regions of interest being out of focus. This may result in capturing a representation of the scene that is undesirable for a user because regions of interest are out of focus and blurry, resulting in loss of detail in the region of interest. For example, two people may be located at different distances from the image capture device with one person in the foreground and on person in a near background of the scene. When one person is out of focus the user may be unable to determine the identity of the person. As another example, two objects at a historic site may be located at different distances from the image capture device with one object in the foreground and one object in the near background of the scene. A user may desire a photograph of the objects to have both objects in focus. The different regions of interest (e.g., the detected people and/or detected objects) may be identified and depths corresponding to the regions determined. The depths may be determined, for example, using data from a depth sensor capture of the scene. In some embodiments, the plurality of regions of interest and the plurality of depths may be determined from one or more of previous image data captured from a camera of the image capture device and/or a depth sensor of the image capture device. In some embodiments, the plurality of regions of interest may be determined using a saliency-based approach. Saliency refers to a likelihood for a human viewer to fixate on a portion of the scene when the viewer is only instructed to look at the scene. In embodiments employing a saliency model, scores may be assigned to pixels or portions of a scene and portions of the scene with a saliency score exceeding a threshold value may be determined to be a region of interest. In some embodiments, high saliency scores may indicate the existence of objects in the scene, or in some embodiments, the existence of faces in the scene.

A camera configuration for capturing image data may be determined based on the plurality of depths determined at block 402. At block 404, an aperture size for a camera for capturing the image data may be determined based on the plurality of depths. For example, a difference between one depth (e.g., a maximum depth) of the plurality of depths and a second depth (e.g., a minimum depth) of the plurality of depths may be determined as a desired depth of focus (DOF) for the scene. An aperture size may be selected that obtains a depth of focus at least as large as the desired depth of focus. In some embodiments, the depth of focus may be prioritized over other characteristics for the camera, such that the aperture size is not increased beyond an aperture size sufficient to meet the desired depth of focus. In some embodiments, the depth of focus may be prioritized in combination with other characteristics for the camera, such that the depth of focus is balanced against, for example, brightness of a scene. In such an embodiment, a determined aperture size may be determined within a range around the desired depth of focus, in which the range may be a predetermined percentage or number of "f-stops" around the desired depth of focus.

Some examples of the prioritizations are provided as follows. In some embodiments of a variable aperture, the available aperture sizes may be discrete "f-stops," such as f/1.2, f/1.4, f/1.8, f/2.0, f/2.2, f/2.4, f/2.8, f/3.2, f/4.0, etc. When a desired depth of focus corresponds to an aperture size between f/1.2 and f/1.4 and camera control prioritizes aperture size, the camera control may determine aperture size of f/1.2, which is the smallest aperture that meets the desired depth of focus. When a desired depth of focus corresponds to an aperture size between f/1.2 and f/1.4 and camera control prioritizes a brightness control to obtain a darker image, the camera control may determine aperture size of f/1.4. In certain scenes, an aperture size with a corresponding depth of field within a predetermined amount of the desired depth of field may be acceptable. In some embodiments of a variable aperture, the available aperture sizes may be continuous, and equations or artificial intelligence (AI) may be used to determine an aperture size that meets one or more conditions, in which at least one of the conditions corresponds to a desired depth of focus. In some embodiments, the aperture size may be determined by determining an initial aperture size based on light conditions in the scene; and adjusting the initial aperture size to determine the aperture size based on the plurality of depths.

At block 406, a lens position for a camera for capturing the image data may be determined based on the plurality of depths. The lens position sets a focal point for the camera, which centers the depth of focus of the aperture size. That is, the range of depths in-focus in the scene is centered about the depth corresponding to the focal depth at the focal point determined by the lens position. The lens position may be determined such that the depth of focus of the aperture size determined at block 404 results in an in-focus region of interest of the scene. The lens position may be determined based on one or more priorities. In some embodiments, such as in some examples described with reference to block 404, the aperture size determined may have a depth of focus less than a desired depth of focus. The lens position may be determined at block 406 to center the depth of focus between two regions of interest to obtain a representation of the scene with as many in-focus regions as possible for the aperture size. The lens position may be determined at block 406 to prioritize one region of interest such that the selected lens position places the prioritized region of interest within the depth of focus at the expense of decreased sharpness in other identified regions of interest.

In some embodiments, when the determined aperture size and lens position leaves a portion of a region of interest partially blurred, a deblurring operation may be applied to at least a portion of one region of interest of the plurality of regions of interest that is beyond the camera depth of focus. The deblurring operation may improve sharpness in the region of interest to obtain a representation of the scene that obtains a synthetic depth of focus that is larger than the actual depth of focus for the aperture size and lens position.

At block 408, the camera is controlled to adjust a variable aperture (VA) of the camera based on the aperture size determined at block 404 and to adjust a lens of the camera case on the lens position determined at block 406. The camera configuration may be, for example with reference to FIG. 2, determined by a camera application 204, provided to camera control 210, and transmitted from the processor 104 to the camera 103 through a bus or other interface. First image data may be received from the camera 103, such as while the image sensor is configured with the camera configuration. The first image data may be received at ISP 112, processed through an image front end (IFE) and/or an image post-processing engine (IPE) of the ISP 112, and stored in memory. In some embodiments, the capture of image data may be initiated by a camera application executing on the processor 104, which causes camera control 210 to activate capture of image data by the camera 103, and cause the image data to be supplied to a processor, such as processor 104 or ISP 112.

Referring back to FIG. 4, at block 410, output image frames are determined based on the first image data captured using the camera configuration set in the camera at block 408. In the example of FIG. 2, image frames 230 may be determined by the processor 104 or ISP 112 and stored in memory 106. The stored image frames may be read by the processor 104 and used to form a preview display on a display of the device 100 (such as displayed through the camera application 204) and/or processed to form a photograph for storage in memory 106 and/or transmission to another device.

Figure 5:
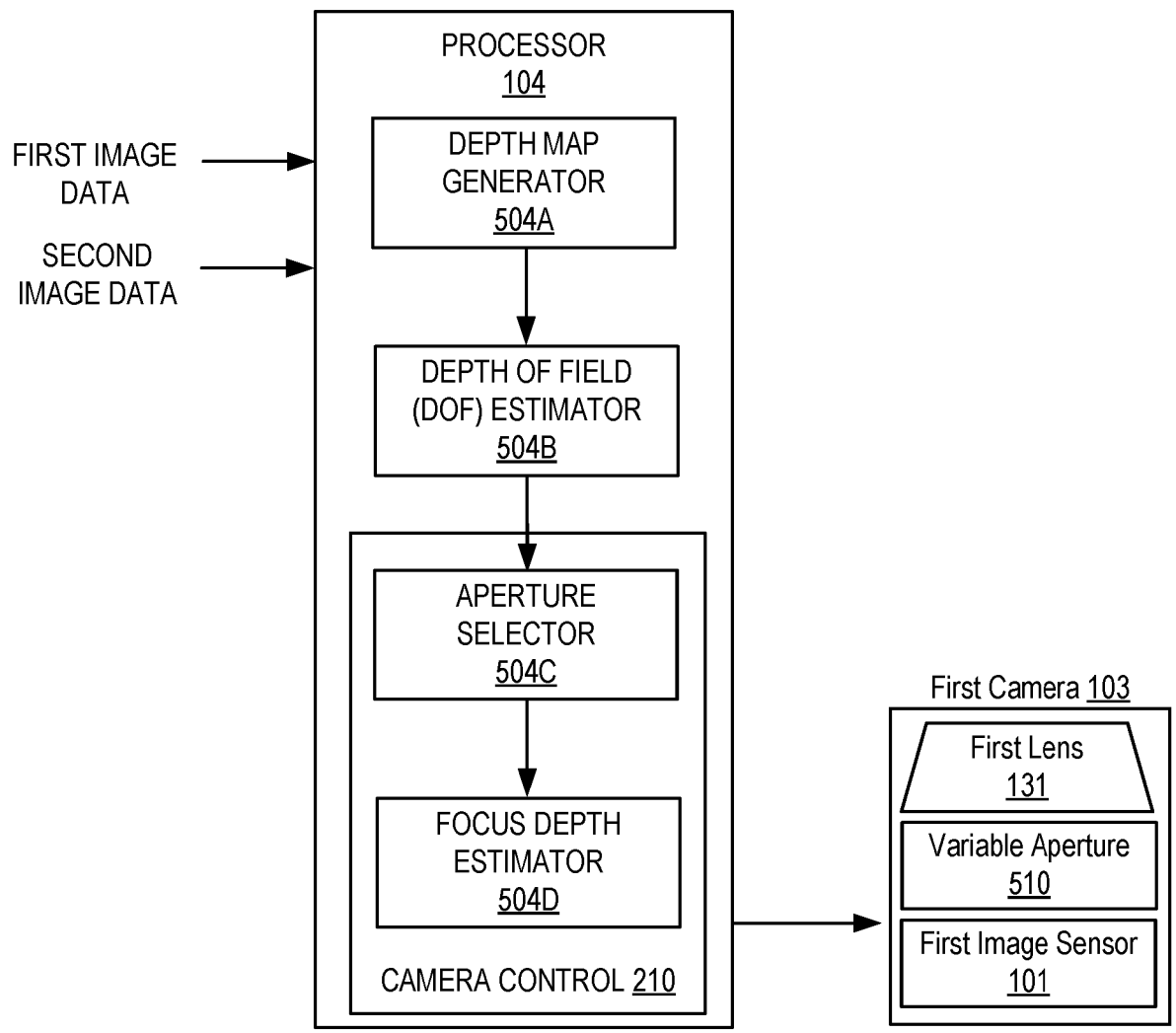
FIG. 5 is a block diagram illustrating an example processor configuration for capturing image data with a variable aperture (VA) camera according to one or more embodiments of the disclosure.

FIG. 5 is a block diagram illustrating an example processor configuration for capturing image data with a variable aperture (VA) camera according to one or more embodiments of the disclosure. The processor 104 may receive first image data, such as previously-captured data from the camera 103 or another camera from which to determine characteristics of the scene, including the presence of one or more objects. The processor 104 may receive second image data, such as depth sensor data, from which to generate a depth map. In some embodiments, the second image data may be additional image data from another image sensor such that the depth map may be generated from disparity calculated from the first image data and the second image data.

Figure 6:
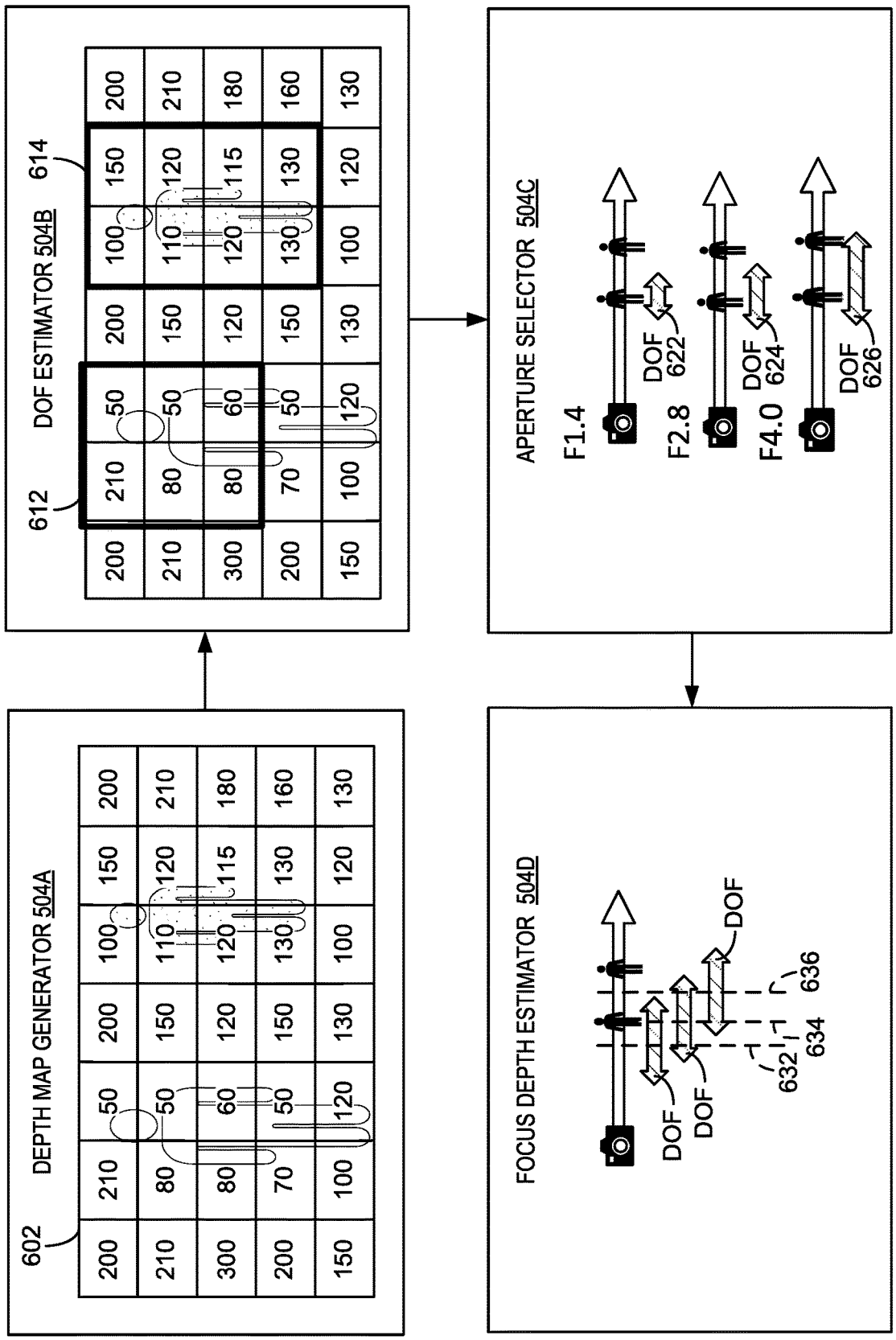
FIG. 6 is a pictorial representation of camera control of a variable aperture (VA) for an example scene according to one or more embodiments of the disclosure.

The processor 104, or other processing circuitry, may be configured to perform one or more operations of the method of FIG. 4 control one or more cameras to capture image data with a desired representation of the scene having sharpness in multiple regions of interest. The image data may be processed to determine one or more output image frames at block 410. Operations of the processor 104 in FIG. 5 are described with reference to an example embodiment shown in FIG. 6. FIG. 6 is a pictorial representation of camera control of a variable aperture (VA) for an example scene according to one or more embodiments of the disclosure.

The processor 104 executes a depth map generator 504A for determining a depth map. An example depth 602 is shown in FIG. 6. The depth map may divide a scene into a plurality of blocks and assign a depth value to each block. Each block may represent a plurality of pixels of a representation of the scene in image data. In such a configuration, the depth value for a block may be determined based on a defined function, such as by determining a depth for the block based on a maximum depth of any pixel in the block, by determining a depth for the block based on a minimum depth of any pixel in the block, by determining a depth for the block based on a median value of the pixels in the block, or by determining a depth for the block based on an average of the pixels in the block. The values of the depth map may indicate actual determined depths, such as a value denominated in a unit of distance (e.g., centimeters or inches). The values of the depth map may alternatively indicate relative depths, which may or may not be denominated in a unit of distance. For example, the depth map 602 may include disparity values.

The processor 104 executes a depth of field (DOF) estimator 504B for determining a plurality of depths for a scene corresponding to a plurality of regions of interests. The DOF estimator 504B may identify objects, such as people, in the scene and corresponding regions 612, 614 of interest in the scene. Object identification, such as face identification, may be performed using, for example, AI engine 124 of the processor 104. A depth value may be determined for each of the regions 612, 614 of interest to associate a depth value with the objects. In the example depth map 602, a depth of 50 centimeters may be associated with the region 612 and a depth of 130 centimeters may be associated with the region 614.

The processor 104 executes an aperture selector 504C for determining an aperture size based on the desired depth of focus determined by DOF estimator 504B. The aperture size may be selected from available aperture sizes (e.g., f/1.4, f/2.8, f/4.0) based on each available aperture size depth of focus and the desired depth of focus. For example, a first aperture size f/1.4 may have a DOF 622, a second aperture size f/2.8 may have a DOF 624, and a third aperture size f/4.0 may have a DOF 626. In an example scene with two regions of interest corresponding to two people, the DOF 622 and DOF 624 may be insufficient to provide a sharp representation of the two people. DOF 626 may be sufficiently large enough to provide a sharp representation of the two people. Aperture selector 504C may select aperture size f/4.0 in this example, although different criteria may be used to select the aperture than merely desired depth of focus alone. The processor 104 may include the selected aperture size, or an indication of the selected aperture size, in a camera configuration transmitted to the camera 103.

The processor 104 executes a focus depth estimator 504D for determining a focus depth and corresponding lens position to achieve the focus point corresponding to the focus depth. The focus depth may center the depth of focus region of the selected aperture. Adjusting the focus depth may adjust the regions of depth that appear sharp at the selected aperture size from aperture selector 504C. For example, a first focus depth 632 may place a first object within the depth of focus of a particular aperture size. Likewise, a second focus depth 632 may place a first object within the depth of focus of a particular aperture size but remain insufficient to place a second object within the depth of focus. A third focus depth 636 may place a first object and a second object within the depth of focus of a particular aperture size. The focus depth estimator 504D may select focus depth 636. A lens position in the camera may be determined for the focus depth 636. In some embodiments, the processor 104 transmits to camera 103 a camera configuration including an indication of the focus depth 636. In some embodiments, the processor 104 transmits to camera 103 a camera configuration including a lens position corresponding to the focus depth 636.

The output of the aperture selector 504C and the focus depth estimator 504D are used by camera control 210 to determine a camera configuration. The camera configuration is transmitted to the camera 103 to control aspects of the first lens 131, the variable aperture 510, and/or the first image sensor 101.

Figure 7:
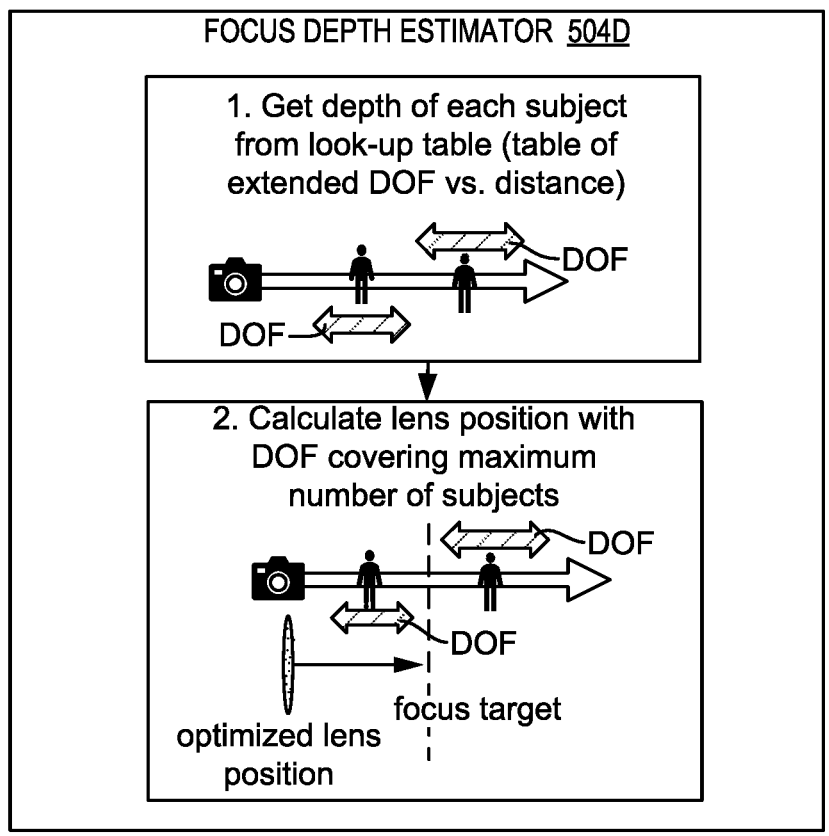
FIG. 7 is a pictorial representation of a lens position control operation for a variable aperture (VA) camera according to one or more embodiments of the disclosure.

A focus depth may be estimated in some embodiments by focus depth estimator 504D according to the example of FIG. 7. FIG. 7 is a pictorial representation of a lens position control operation for a variable aperture (VA) camera according to one or more embodiments of the disclosure. The focus depth estimator 504D may first retrieve a depth of each region of interest, or subject in a region of interest, from, for example, a look-up table (LUT). The LUT may be a table of extended depth of focuses associated with distances. The result may locate each object along a linear dimension corresponding to depth from the image sensor, in which each object has a depth of field (DOF) around the location on the linear dimension. The DOF may correspond to the DOF at the determined aperture size. The focus depth estimator 504D may use the listing of objects along the depth dimension and their associated DOFs to determine a lens position such that a maximum number of objects are in-focus at the determined aperture size and lens position.

Figure 8:
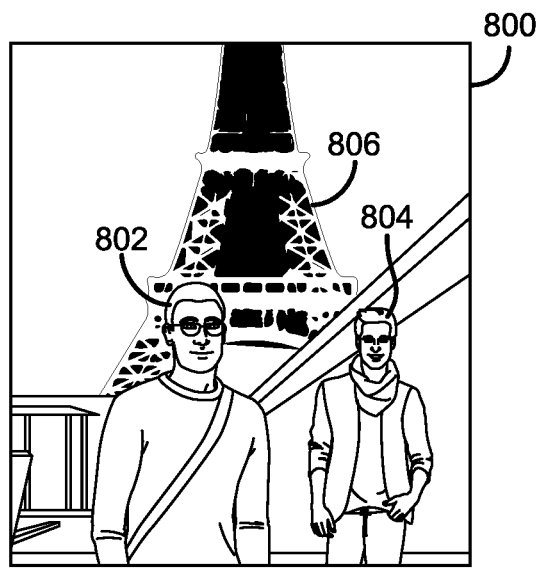
FIG. 8 is a pictorial representation of captured image data from a variable aperture (VA) camera according to one or more embodiments of the disclosure.

The techniques described for controlling a camera of an image capture device may be used to obtain photographs with multiple objects in focus. The improved photography may be obtained by controlling a variable aperture (VA) of the camera to obtain sharp objects in multiple regions of interest. An example of such a photograph is shown in FIG. 8. FIG. 8 is a pictorial representation of captured image data from a variable aperture (VA) camera according to one or more embodiments of the disclosure. A photograph 800 may include a first object 802 and a second object 804 captured with sharp detail and a third object 806 in a blurred background. The first and second objects 802 and 804 are captured in-focus because the variable aperture (VA) of the camera is controlled to an aperture size that provides a depth of focus that covers both objects 802 and 804 and the lens position of the camera is controlled to a focus depth that obtains a depth of focus that covers both objects 802 and 804.

In one or more aspects, techniques for supporting image processing may include additional aspects, such as any single aspect or any combination of aspects described below or in connection with one or more other processes or devices described elsewhere herein. In a first aspect, supporting image processing may include an apparatus configured for determining a plurality of depths for a scene, the plurality of depths corresponding to a plurality of regions of interest; determining an aperture size for a camera based on the plurality of depths; and/or determining a lens position for the camera based on the aperture size and the plurality of depths. The apparatus of the first aspect may be further configured for controlling the camera to adjust a variable aperture (VA) of the camera based on the aperture size and to adjust a lens associated with the variable aperture (VA) based on the lens position.

Additionally, the apparatus may perform or operate according to one or more aspects as described below. In some implementations, the apparatus includes a wireless device, such as a UE. In some implementations, the apparatus includes a remote server, such as a cloud-based computing solution, which receives image data for processing to determine output image frames. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a second aspect, in combination with the first aspect, the apparatus is further configured for determining a plurality of objects of the scene, wherein the plurality of depths correspond to the plurality of objects.

In a third aspect, in combination with one or more of the first aspect or the second aspect, determining an aperture size comprises determining an aperture size having a depth of focus at least as large as a distance between a first depth (e.g., a minimum depth) of the plurality of depths and a second depth (e.g., a maximum depth) of the plurality of depths.

In a fourth aspect, in combination with one or more of the first aspect through the third aspect, determining a lens position comprises determining a lens position such that the depth of focus around the lens position includes at least the minimum depth of the plurality of depths and the maximum depth of the plurality of depths.

In a fifth aspect, in combination with one or more of the first aspect through the fourth aspect, determining a plurality of depths for a scene comprises determining a location of at least two faces in the scene, wherein the plurality of depths correspond to depths at the location of the at least two faces.

In a sixth aspect, in combination with one or more of the first aspect through the fifth aspect, determining an aperture size for the camera comprises: determining an initial aperture size based on light conditions in the scene; and adjusting the initial aperture size to determine the aperture size based on the plurality of depths.

In a seventh aspect, in combination with one or more of the first aspect through the sixth aspect, determining a plurality of depths for a scene comprises receiving depth data for the scene from a depth sensor.

In an eighth aspect, in combination with one or more of the first aspect through the seventh aspect, the depths are obtained from one or more of active depth sensors (e.g., indirect Time of Flight (iToF), direct Time of Flight (dToF), light detection and ranging (Lidar), mmWave, radio detection and ranging (Radar)), hybrid depth sensors, such as structured light, and/or passive depth sensing (e.g., disparity between two image sensors (e.g., using depth-from-disparity or depth-from-stereo), and/or phase detection auto-focus (PDAF) sensors).

In a ninth aspect, in combination with one or more of the first aspect through the eighth aspect, receiving image data from the camera, the image data captured at the variable aperture and the lens position; and determining at least one image frame based on the image data.

In a tenth aspect, in combination with one or more of the first aspect through the ninth aspect, the apparatus is further configured for determining a camera depth of focus for the camera at the lens position and at the aperture size is less than a distance between a first depth (e.g., a minimum depth) of the plurality of depths and a second depth (e.g., a maximum depth) of the plurality of depths, wherein the determining the at least one image frame comprises deblurring at least a portion of one region of interest of the plurality of regions of interest that is beyond the camera depth of focus.

In an eleventh aspect, in combination with one or more of the first aspect through the tenth aspect, the apparatus is further configured for determining a location of at least two faces in the scene.

In a twelfth aspect, in combination with one or more of the first aspect through the eleventh aspect, receiving user input to specify the plurality of regions of interest from the location of the at least two faces in the scene.

In a thirteenth aspect, in combination with one or more of the first aspect through the twelfth aspect, the plurality of depths correspond to faces in the scene selected by a user, determining an aperture size comprises determining an aperture size having a depth of focus based on a distance between a first depth (e.g., a minimum depth) of the plurality of depths and a second depth (e.g., a maximum depth) of the plurality of depths, and determining a lens position comprises determining a lens position based on a distance between the minimum depth of the plurality of depths and the maximum depth of the plurality of depths.

In a fourteenth aspect, in combination with one or more of the first aspect through the thirteenth aspect, the apparatus is further configured for receiving image data from the camera, the image data captured at the variable aperture and comprising; and determining at least one image frame based on the image data.

In a fifteenth aspect, in combination with one or more of the first aspect through the fourteenth aspect, the apparatus may include a camera comprising an image sensor, a variable aperture (VA), and a position-able lens (such as with mechanical, electro-mechanical, or electrical control for adjusting a distance between the lens and the image sensor).

In a sixteenth aspect, in combination with one or more of the first aspect through the fifteenth aspect, the apparatus is further configured for receiving first image data representing the scene from the camera and for determining a plurality of locations of a plurality of objects of the scene by performing object detection on the first image data, wherein the plurality of depths correspond to the plurality of objects.

In a seventeenth aspect, combination with one or more of the first aspect through the sixteenth aspect, the apparatus is further configured for receiving user input to specify the plurality of regions of interest from the plurality of locations, wherein the plurality of depths correspond to objects in the scene selected by a user, wherein determining an aperture size comprises determining an aperture size having a depth of focus based on a distance between a first depth of the plurality of depths and a second depth of the plurality of depths, and wherein determining a lens position comprises determining a lens position based on a distance between the first depth of the plurality of depths and the second depth of the plurality of depths.

In an eighteenth aspect, combination with one or more of the first aspect through the seventeenth aspect, determining the plurality of locations of a plurality of objects of the scene comprises determining a plurality of locations of a plurality of faces of the scene by performing facial recognition on the first image data.

In a nineteenth aspect, combination with one or more of the first aspect through the eighteenth aspect, determining the plurality of locations of a plurality of objects of the scene comprises determining a plurality of locations by applying a saliency model to the first image data to determine locations having a salience score above a threshold value.

In a twentieth aspect, in combination with one or more of the first aspect through the nineteenth aspect, the apparatus is further configured for receiving image data from the camera, the image data captured based on the aperture size and the lens position (with the operation based on the lens position such as when a seed for an autofocus algorithm is the determined lens position and the autofocus algorithm further refines fine focus or refocuses to track an object in a region of interest); and determining at least one image frame based on the image data.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-6 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill in the art that one or more blocks (or operations) described with reference to FIGS. 4 and 5 may be combined with one or more blocks (or operations) described with reference to another of the figures. For example, one or more blocks (or operations) of FIG. 4 may be combined with one or more blocks (or operations) of FIG. 1. As another example, one or more blocks associated with FIG. 5 may be combined with one or more blocks (or operations) associated with FIG. 1. Additionally, or alternatively, one or more operations described above with reference to FIGS. 1-2 may be combined with one or more operations described with reference to FIGS. 3-5.

Those of skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, which is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, opposing terms such as "upper" and "lower" or "front" and "back" or "top" and "bottom" or "forward" and "backward" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method, comprising:
   determining a plurality of depths for a scene and a plurality of regions of interest, wherein a first one of the plurality of regions of interest corresponds to a first one of the plurality of depths, which is at a first distance from a reference point, and a second one of the plurality of regions of interest corresponds to a second one of the plurality of depths, which is at a second distance from the reference point;
   determining an aperture size for a camera based on a difference between the first distance and the second distance;
   determining a lens position for the camera that provides a focal plane that is between the first distance and the second distance based on the aperture size and the first one of the plurality of depths and the second one of the plurality of depths; and
   controlling the camera to adjust a variable aperture (VA) of the camera based on the determined aperture size and to adjust a lens associated with the variable aperture (VA) based on the determined lens position.

2. The method of claim 1, wherein determining the aperture size comprises determining an aperture size having a depth of focus at least as large as the difference between the first distance and the second distance.

3. The method of claim 2, wherein determining the lens position comprises determining a lens position such that the first one of the plurality of depths and the second one of the plurality of depths are both within the depth of focus extending around a focal plane of the lens position.

4. The method of claim 1, wherein determining the plurality of regions of interest comprises determining locations of at least two faces in the scene, wherein the first of the plurality of depths and the second of the plurality of depths correspond to respective depths at the locations of the at least two faces.

5. The method of claim 1, wherein determining the aperture size for the camera comprises:
   determining an initial aperture size based on light conditions in the scene; and
   adjusting the initial aperture size to determine the aperture size based on the difference between the first distance and the second distance.

6. The method of claim 1, wherein determining the plurality of depths for a scene comprises receiving depth data for the scene from a depth sensor.

7. The method of claim 1, further comprising:
   receiving image data from the camera, the image data captured at the variable aperture and the lens position; and
   determining at least one image frame based on the image data.

8. The method of claim 7, further comprising:
determining a camera depth of focus for the camera at the lens position and at the aperture size is less than a distance between a first depth of the plurality of depths and a second depth of the plurality of depths, wherein the determining the at least one image frame comprises deblurring at least a portion of one region of interest of the plurality of regions of interest that is beyond the camera depth of focus.

9. The method of claim 1, further comprising:
receiving first image data representing the scene from the camera, wherein the determining of the plurality of regions of interest comprises determining a plurality of locations of a plurality of objects of the scene by performing object detection on the first image data.

10. The method of claim 9, further comprising:
receiving user input to specify the plurality of regions of interest from the plurality of locations, wherein the first one of the plurality of depths and the second one of the plurality of depths correspond to objects in the scene selected by a user.

11. The method of claim 10, wherein determining the plurality of locations of a plurality of objects of the scene comprises determining a plurality of locations of a plurality of faces of the scene by performing facial recognition on the first image data.

12. The method of claim 10, wherein determining the plurality of locations of a plurality of objects of the scene comprises determining a plurality of locations by applying a saliency model to the first image data to determine locations having a salience score above a threshold value.

13. The method of claim 10, further comprising:
receiving second image data from the camera after controlling the camera to adjust a variable aperture (VA) of the camera based on the aperture size and to adjust a lens associated with the variable aperture (VA) based on the lens position, the second image data captured based on the aperture size and the lens position; and
determining at least one image frame based on the second image data.

14. An apparatus, comprising:
a memory storing processor-readable code; and
at least one processor coupled to the memory, the at least one processor configured to execute the processor-readable code to cause the at least one processor to perform operations including:
determining a plurality of depths for a scene and a plurality of regions of interest, wherein a first one of the plurality of regions of interest corresponds to a first one of the plurality of depths, which is at a first distance from a reference point, and a second one of the plurality of regions of interest corresponds to a second one of the plurality of depths, which is at a second distance from the reference point;
determining an aperture size for a camera based on a difference between the first distance and the second distance;
determining a lens position for the camera that provides a focal plane that is between the first distance and the second distance based on the aperture size and the first one of the plurality of depths and the second one of the plurality of depths; and
controlling the camera to adjust a variable aperture (VA) of the camera based on the determined aperture size and to adjust a lens associated with the variable aperture (VA) based on the determined lens position.

15. The apparatus of claim 14, wherein determining the lens position comprises determining a lens position such that the first one of the plurality of depths and the second one of the plurality of depths are both within the depth of focus extending around a focal plane of the lens position.

16. The apparatus of claim 14, wherein determining the aperture size comprises determining an aperture size having a depth of focus at least as large as the different between the first distance and the second distance.

17. The apparatus of claim 14, wherein determining the plurality of regions of interest comprises determining locations of at least two faces in the scene, wherein the first of the plurality of depths and the second of the plurality of depths correspond to respective depths at the locations of the at least two faces.

18. The apparatus of claim 14, wherein determining the aperture size for the camera comprises:
determining an initial aperture size based on light conditions in the scene; and
adjusting the initial aperture size to determine the aperture size based on the difference between the first distance and the second distance.

19. The apparatus of claim 14, wherein determining the plurality of depths for a scene comprises receiving a depth map for the scene from a depth sensor.

20. The apparatus of claim 14, wherein the processor is further configured to perform operations comprising:
receiving image data from the camera, the image data captured at the variable aperture and the lens position; and
determining at least one image frame based on the image data.

21. The apparatus of claim 20, wherein the processor is further configured to perform operations comprising:
determining a camera depth of focus for the camera at the lens position and at the aperture size is less than a distance between a first depth of the plurality of depths and a second depth of the plurality of depths, wherein the determining the at least one image frame comprises deblurring at least a portion of one region of interest of the plurality of regions of interest that is beyond the camera depth of focus.

22. The apparatus of claim 14, wherein the processor is further configured to perform operations comprising:
receiving first image data representing the scene from the camera; and determining a plurality of locations of a plurality of objects of the scene by performing object detection on the first image data, wherein the plurality of depths correspond to the plurality of objects.

23. The apparatus of claim 22, wherein the processor is further configured to perform operations comprising:
receiving user input to specify the plurality of regions of interest from the plurality of locations, wherein the first one of the plurality of depths and the second one of the plurality of depths correspond to objects in the scene selected by a user.

24. The apparatus of claim 23, wherein determining the plurality of locations of a plurality of objects of the scene comprises determining a plurality of locations of a plurality of faces of the scene by performing facial recognition on the first image data.

25. The apparatus of claim 23, wherein determining the plurality of locations of a plurality of objects of the scene comprises determining a plurality of locations by applying a saliency model to the first image data to determine locations having a salience score above a threshold value.

\* \* \* \* \*